United States Patent [19]

Inoue et al.

[11] 4,197,136
[45] Apr. 8, 1980

[54] OPTICAL TRANSMISSION LINE GLASS AND ITS METHOD OF MANUFACTURE

[75] Inventors: Kozo Inoue; Junjiro Goto, both of Kobe; Yoshio Kawabata, Takosago, all of Japan

[73] Assignee: Fujitsu Limited, Kawasaki, Japan

[21] Appl. No.: 847,179

[22] Filed: Oct. 31, 1977

[30] Foreign Application Priority Data

Nov. 2, 1976 [JP] Japan .................. 51-132135
Jun. 15, 1977 [JP] Japan .................. 52-71265

[51] Int. Cl.² ................ C03C 3/12; C03C 3/16
[52] U.S. Cl. ................... 106/47 Q; 65/3 A; 106/50; 350/96.34
[58] Field of Search .......... 106/47 Q, 50; 65/3 A, 65/DIG. 7; 350/96.34

[56] References Cited

U.S. PATENT DOCUMENTS

| | | | |
|---|---|---|---|
| 3,731,226 | 5/1973 | Snitzer et al. | 106/47 Q |
| 3,864,113 | 2/1975 | Dumbaugh et al. | 65/3 A |
| 3,923,484 | 12/1975 | Randall | 65/DIG. 7 |
| 4,009,014 | 2/1977 | Black et al. | 65/DIG. 7 |
| 4,042,404 | 8/1977 | Schultz | 106/52 |
| 4,062,665 | 12/1977 | Izawa et al. | 65/3 A |

FOREIGN PATENT DOCUMENTS

| | | | |
|---|---|---|---|
| 2458389 | 7/1975 | Fed. Rep. of Germany | 65/3 A |
| 2546162 | 9/1976 | Fed. Rep. of Germany | 350/96.31 |
| 2530514 | 1/1977 | Fed. Rep. of Germany | 65/3 A |
| 2530786 | 1/1977 | Fed. Rep. of Germany | 65/3 A |
| 2531237 | 1/1977 | Fed. Rep. of Germany | 65/3 A |

OTHER PUBLICATIONS

Applied Optics, vol. 14, No. 3, Mar. 1975-p. A66, "Of Optics and Opticists,"-Optical Communications.
Payne, D. N. et al.-"A Bordsilicate-Cladded Phosphosilicate-Core Optical Fibre," Optics Communications-vol. 13, No. 4-Apr. 1975-pp. 422-425.

*Primary Examiner*—Helen M. McCarthy
*Attorney, Agent, or Firm*—Daniel Jay Tick

[57] ABSTRACT

Optical transmission line glass includes phosphorus pentoxide and germanium dioxide as the major glass forming oxides and gallium trioxide for waterproofing and refractive index control. A method of manufacture of such glass material utilizes a gas phase chemical reaction.

3 Claims, 6 Drawing Figures

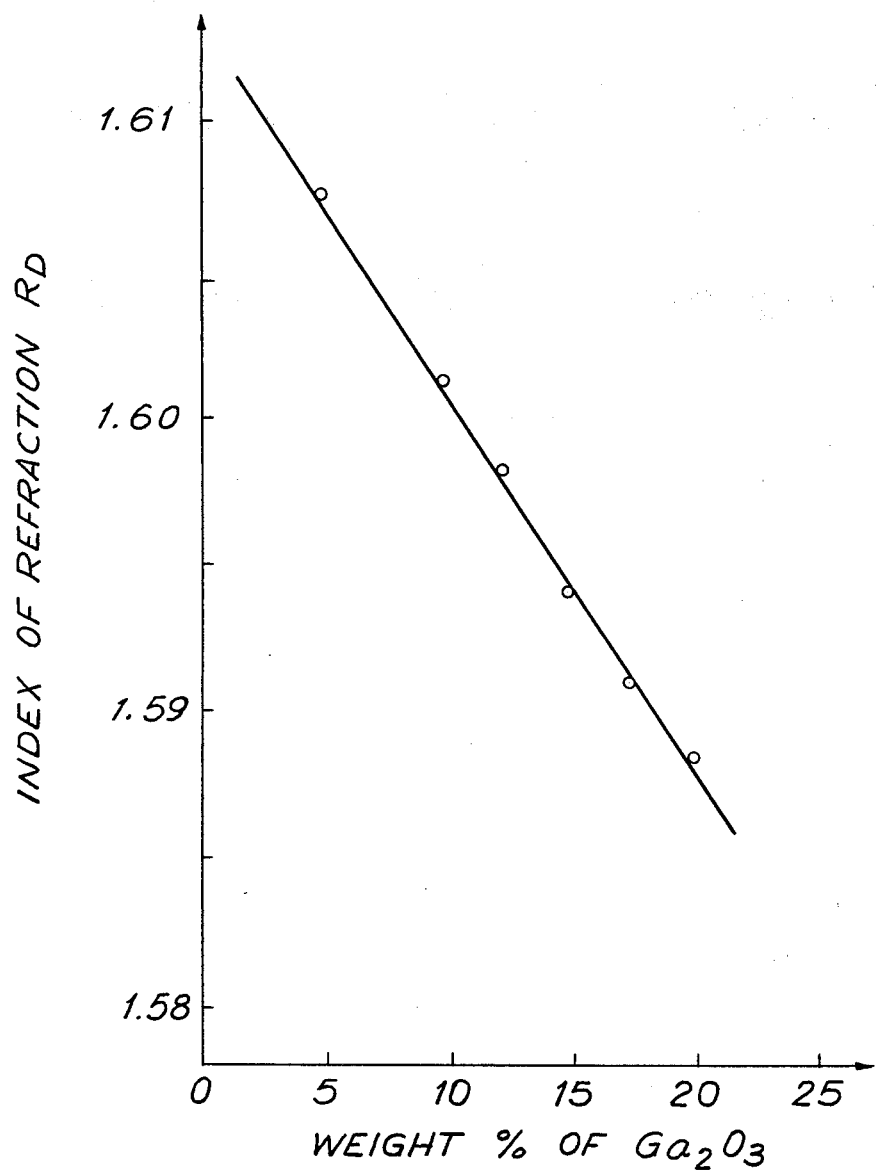

OPTICAL TRANSMISSION LINE GLASS AND ITS METHOD OF MANUFACTURE

BACKGROUND OF THE INVENTION

The present invention relates to an optical transmission line glass and its method of manufacture.

An optical transmission line or optical fiber used as a transmission line for optical communication must have an extremely low impurity content, since such impurities deteriorate optical transmission characteristics.

A well known method of obtaining extremely pure glass material is one in which the fine powder of the glass forming oxide, or soot, is produced by the use of a gas phase chemical reaction. The soot is then vitrified and spun into glass fiber. In this method, since a compound of high purity, such as, for example, silicon tetrachloride ($SiCl_4$), germanium tetrachloride ($GeCl_4$), used in the manufacture of semiconductors, may be used as the raw material, extremely pure glass soot may be obtained only if the other reaction gases such as, for example, oxygen and hydrogen, are pure. However, the method of manufacture utilizing existing gas phase chemical reaction, as hereinbefore explained, uses a glass tube or glass rod as a support in order to permit the soot to stick to the inside wall of the tube or around the outside surface of the rod. This method is thus not suitable for mass production. Furthermore, in the known method hereinbefore described, soot consisting primarily of silicon dioxide ($SiO_2$) is generally produced. Such soot has a usually high vitrifying temperature and the disadvantage that the vessel is corroded when vitrification is carried out in a silica vessel. On the other hand, if a vessel of metal such as, for example, platinum, is used instead of a silica vessel, the metal vessel dissolves into the glass material, distinctively deteriorating optical characteristics of the glass.

The principal object of the invention is to provide optical transmission line glass having excellent optical characteristics.

An object of the invention is to provide optical transmission line glass of few ingredients which is non-alkaline and has excellent optical characteristics.

Another object of the invention is to provide optical transmission line glass which is non-alkaline.

Still another object of the invention is to provide optical transmission line glass which is vitrified at a comparatively low temperature.

Yet another object of the invention is to provide optical transmission line glass having excellent waterproofing characteristics.

Another object of the invention is to provide optical transmission line glass which is vitrified in a silica vessel, which it does not corrode.

Still another object of the invention is to provide a method of manufacture of optical transmission line glass in which a volatile acidic oxide is mixed in the gas phase with a compound of an element which combines with such oxide in the gaseous state or gas phase and then oxidized to produce a bi-compound.

Yet another object of the invention is to provide a method of manufacture of optical transmission line glass in which glass fiber is spun by vitrification in a silica vessel and then drawn from a hole provided at the bottom of the vessel.

Still another object of the invention is to provide a method of manufacture of optical transmission line glass, which method is efficient and suitable for mass production.

BRIEF SUMMARY OF THE INVENTION

In accordance with the invention, the optical transmission line glass of the invention always includes gallium oxide ($Ga_2O_3$) and includes phosphoric oxide ($P_2O_5$) and germanium oxide ($GeO_2$) as the principal components. The glass is sufficiently vitrified at 1400° C. and has a non-alkaline nature. Therefore, it may be easily vitrified in a silica vessel without corroding the vessel.

The glass is easily soluble, in water, when it includes a very small amount of $Ga_2O_3$, but has excellent waterproof characteristics when $Ga_2O_3$ of about 10 weight % is added.

In order to manufacture the glass, a halogenide of phosphorus and a halogenide of germanium are mixed in the gas phase and the mixed gas is heated with oxygen for the purpose of oxidization. The glass forming oxide is produced by such oxidization. Since the volatile $P_2O_5$ is combined with germanium (Ge) and formed into a non-volatile compound in such oxidized reaction, the loss of phosphorus due to vaporization of $P_2O_5$ may be reduced drastically.

When $Ga_2O_3$ is added to the mixed oxide, or is mixed in the form of $GaCl_3$ to a gaseous phosphorus compound such as, for example, phosphoric trichloride ($PCl_3$), and a germanium compound such as, for example, germanium tetrachloride ($GeCl_4$), and formed into glass soot and these are vitrified, transparent glass including $Ga_2O_3$ is obtained. The addition of $Ga_2O_3$ insures sufficient waterproof characteristics. The refractive index of the glass material formed is lowered as the content of $Ga_2O_3$ increases. Thus, by controlling the mixed content of $Ga_2O_3$, a glass material having an adequate refractive index may be obtained for use as a core and as cladding.

In accordance with the invention, an optical transmission line glass essentially includes 10 to 58 weight % of phosphoric pentoxide $P_2O_5$, 15 to 85 weight % of germanium dioxide $GeO_2$, and 5 to 40 weight % of gallium trioxide $Ga_2O_3$.

The gallium trioxide $Ga_2O_3$ is provided as a network modifier for increasing water resistance.

The phosphoric pentoxide and germanium dioxide, are the principal components, and are in a weight ratio of 4:6 and the gallium trioxide is the remainder in an amount of 10 to 25 weight %.

In accordance with the invention, an optical transmission line glass essentially includes phosphoric pentoxide $P_2O_5$, an oxide of an element able to form a compound with the phosphoric pentoxide, said oxide consisting of at least one of germanium dioxide $GeO_2$ and silicon dioxide $SiO_2$, and gallium trioxide $Ga_2O_3$ for controlling the refractive index, said phosphoric pentoxide and said oxide being in an amount of at least 50 weight %.

The gallium trioxide is in an amount of 40 weight % or less for controlling the refractive index.

An additional eutectic oxide consisting of at least one oxide from the group consisting of BeO, MgO, CaO, SrO, BaO, ZnO, CdO, $B_2O_3$, $Al_2O_3$, PbO, $As_2O_3$ is provided in amounts which would not affect the refractive index.

In accordance with the invention, the method of manufacture of optical transmission line glass, comprises the steps of mixing a volatile phosphoric oxide and a volatile compound of at least one element able to form a compound with phosphorus at a specified rate in a gaseous state, the gaseous chemical reaction producing a compound of the elements, adding gallium oxide $Ga_2O_3$ to the compound, and vitrifying the compound and the added gallium oxide.

The gallium oxide is mixed with the phosphoric compound in the gaseous state as a volatile gallium compound.

The gallium oxide is mixed with another glass forming oxide in the solid state.

The volatile phosphoric oxide consists of at least one of phosphorous oxychloride $POCl_3$ and phosphoric trichloride $PCl_3$ and the element able to form a compound with phosphorus is germanium tetrachloride $GeCl_4$ and is mixed as the volatile compound in the gaseous state. Flame hydrolysis is provided for producing the compound of the elements.

Dry gas is blown into the glass material during vitrification after adding the gallium oxide to the compound to provide homogeneity of the glass and to remove water from the glass.

The production of the compound of the elements via the gaseous chemical reaction is in a vessel and heating during vitrification is in the same vessel.

In accordance with the invention, the method of manufacture of optical transmission line glass comprises the steps of providing a phosphorus compound, providing a germanium compound and combining it with the phosphorus compound, adding a first amount of gallium oxide $Ga_2O_3$ to the phosphorus and germanium compounds to produce a first type of glass material having a first concentration of gallium oxide, adding a second amount of gallium oxide $Ga_2O_3$ to the phosphorus and germanium compounds to produce a second type of glass material having a second concentration of gallium oxide, placing both types of glass material in a double crucible having a sealed bottom, melting the glass materials in the crucible to provide vitrification, and opening the bottom of the crucible to spin out an optical transmission line.

In accordance with the invention, an optical transmission line comprises core glass consisting of a phosphate glass having gallium oxide $Ga_2O_3$ in a first concentration, said core glass having a first refractive index, and cladding glass consisting of a phosphate glass having gallium oxide $Ga_2O_3$ in a second concentration greater than the first concentration, said cladding glass having a second index of refraction less than the first refractive index.

BRIEF DESCRIPTION OF THE DRAWINGS

In order that the invention may be readily carried into effect, it will now be described with reference to the accompanying drawings, wherein:

FIG. 2 is a graphical presentation of the relation between the concentration of $Ga_2O_3$ in the three component glass of the invention and the refractive index of the glass;

DETAILED DESCRIPTION OF THE INVENTION

Figure 1:
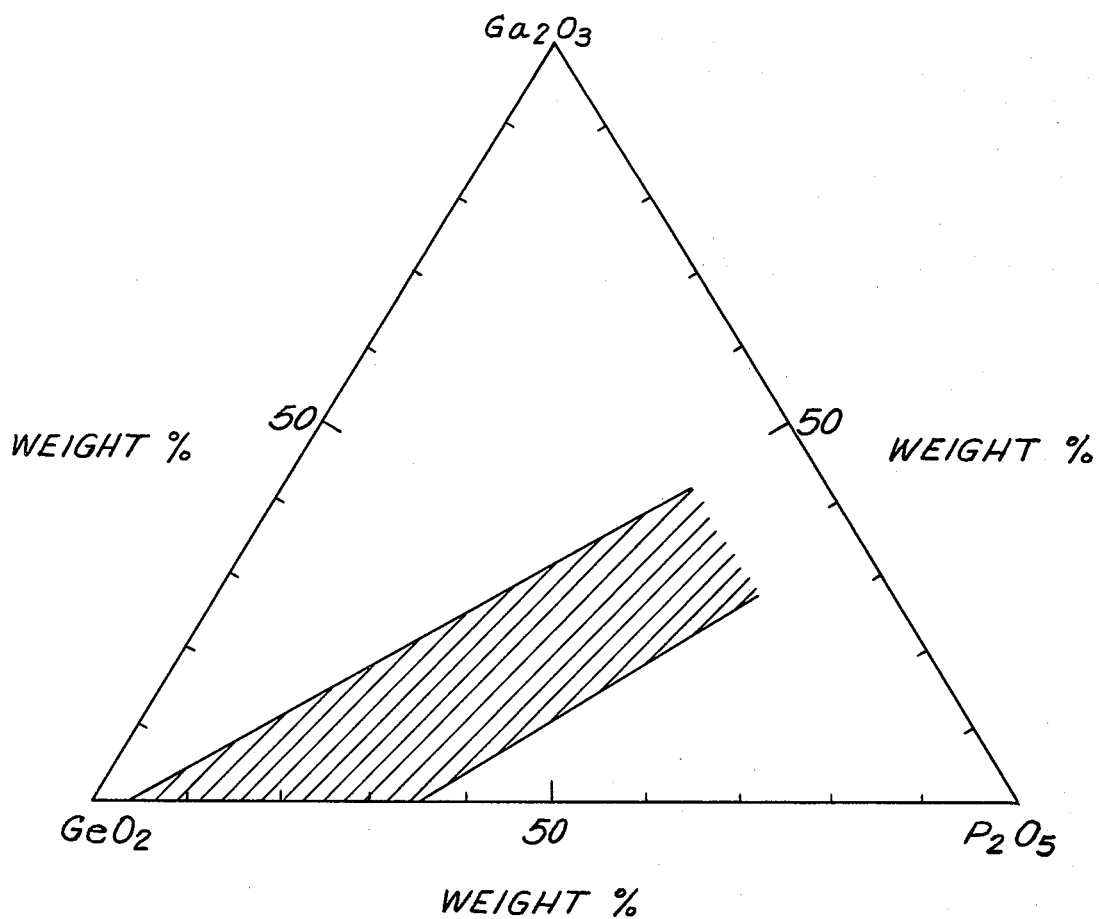
FIG. 1 is a graphical presentation of the scope of composition of the optical transmission line glass material of the invention.

Silicon dioxide ($SiO_2$) is an acidic oxide easily corroded by alkaline, but not corroded by weak acidic material. Phosphoric oxide ($P_2O_5$) is well known as an acidic glass forming oxide, but the $P_2O_5$ itself is chemically active and particularly well absorbs moisture in the air. Furthermore, $P_2O_5$ is easily vaporized and is therefore vaporized in a large amount at a high temperature in the vitrifying process. As a result of the vaporization of $P_2O_5$, the concentration of $P_2O_5$ in the glass material produced becomes comparatively low as compared with the initial mixing ratio.

However, if $GeCl_4$ and phosphoric trichloride ($PCl_3$) or phosphorous oxychloride $POCl_3$ are oxidized simultaneously in the gas phase or in their gaseous state, a compound having the composition $Ge(HPO_4)_2$ is produced and the vaporization of $P_2O_5$ diminishes. Thus, for example, $POCl_3$ and $GeCl_4$ were mixed in the gaseous state and provided an intermediate product in the form of powder by the flame hydrolysis of such mixed gas. Furthermore, we obtained the glass material by heating and melting such product. As a result of an analysis by X-ray diffraction, the intermediate product proved to contain $Ge(HPO_4)_2$. However, this two component glass is soluble in water and well absorbs moisture in the air. Therefore, it cannot be used directly for optical fiber.

On the other hand, it has been proven that the soot obtained by oxidizing the gallium trichloride ($GaCl_3$) as a gas when performing the aforedescribed gaseous chemical reaction has excellent waterproof characteristics and absorbs less moisture, as hereinafter explained.

Furthermore, it has also been proven that the soot containing the oxide of three kinds of elements such as phosphorus (P), germanium (Ge) and gallium (Ga) is in non-crystalline condition before melting. In addition, this soot melts when heated to about 1400° C. and forms transparent and homogeneous glass when cooled. An analysis by emission spectroscopy, in order to detect silicon (Si) in the glass after vitrification in the silica vessel, has proven that there are very few Si atoms in this glass. From this fact, it may be said that the aforedescribed glass does not corrode the silica vessel substantially at a temperature of 1400° C. This is also the fact obtained by a method in which only compounds of phosphorus and germanium are changed into soot by flame hydrolysis and then additionally prepared $Ga_2O_3$ is mixed with the soot in the form of powder in order to obtain the other compound. It is therefore obvious that gallium (Ga) in the three component soot obtained by flame hydrolysis exists in the form of $Ga_2O_3$.

We have found that the refractive index of the three component glass, including the aforedescribed $Ga_2O_3$ changed linearly with an increase in the content of $Ga_2O_3$. The present invention is based on such various viewpoints, and the preferred embodiment of the invention is explained, as follows.

$POCl_3$ and $GeCl_4$ gases are mixed in a rate in accordance with calculations in terms of the ratio of $P_2O_5$:$GeO_2$. Soot having the component ratio shown in Table 1 is then produced from the mixed gas by flame hydrolysis. $Ga_2O_3$ powder is mixed to the soot in amounts shown in Table 1. The mixed powder is heated for two hours at about 1400° C. in a silica crucible for the purpose of vitrification. Homogeneous and transparent glass, devoid of bubbles is thereby obtained. $Ga_2O_3$ used in the aforedescribed manner is produced separately by flame hydrolysis.

Table 1

| | $P_2O_5:GeO_2$ | $Ga_2O_3$ (wt %) |
|---|---|---|
| 1 | 20:80 | 0 to 12 |
| 2 | 30:70 | 5 to 20 |
| 3 | 40:60 | 7 to 25 |

The rate of $P_2O_5$ and $GeO_2$ is controlled by the flow of the respective carrier gases of $POCl_3$ and $GeCl_4$. Thus, for example, when $POCl_3$ at 40° C. is supplied at a flow rate of 2 liters/min., soot having a wt % of $P_2O_5:GeO_2=4:6$ is obtained if a flow rate of GeCl at 40° C. is considered as 0.75 liters per minute. Furthermore, it has been confirmed by X-ray diffraction that the soot formed by the aforedescribed method includes the component $Ge(HPO_4)_2$. The amount of $P_2O_5$ in the glass obtained from this soot is little reduced, compared with the initial mixing ratio. This fact is made apparent from Table 2. Table 2 shows the comparison component ratio obtained by analyzing the soot and that obtained by analyzing the glass after vitrification of said soot. The constitution is determined so that component A is for core glass of an optical fiber and component B is for cladding glass.

Table 2

| | | Component ratio (weight %) | | |
|---|---|---|---|---|
| | | $GeO_2$ | $P_2O_5$ | $Ga_2O_3$ |
| A | Soot | 55.8 | 34.2 | 10.0 |
| | Glass | 56.0 | 34.0 | 10.0 |
| B | Soot | 49.6 | 30.4 | 20.0 |
| | Glass | 48.3 | 31.1 | 20.6 |

FIG. 1 shows the vitrification area of soot manufactured by the aforedescribed method using triangular coordinates. The hatched area indicates the vitrifiable area confirmed by experiment. Vitrification may be provided with a weight percent of $P_2O_5$ 2 to 58, $GeO_2$ 15 to 95 and $Ga_2O_3$ 0 to 40. However, the component ratio given here for both Table 1 and Table 2 is obtained by detecting the content of each positive element by the quantitative analysis of the glass. This value is then converted to that of the oxide of each positive element.

On the other hand, the aforedescribed three component glass its refractive index changes according to the concentration of $Ga_2O_3$. FIG. 2 shows the relation between the concentration of $Ga_2O_3$ and the refractive index. In FIG. 2, the abscissa represents the weight % of $Ga_2O_3$ and the ordinate represents the index of refraction or the refractive index $R_D$. In FIG. 2, the weight ratio of $P_2O_5$ and $GeO_2$ is fixed at 40:60 and the mixing ratio of $Ga_2O_3$ for such weight ratio is changed. The relation between the mixing ratio and refraction coefficient of glass after mixing is then plotted.

As is obvious from FIG. 2, the refractive index decreases almost linearly with an increase in the concentration of $Ga_2O_3$. Therefore, glass for a core and glass for cladding having a desired refractive index may be obtained by controlling the amount of $Ga_2O_3$. Glasses containing $Ga_2O_3$ of 10% or less are just suitable as core glasses, while glasses containing larger amounts of $Ga_2O_3$ than in the case of core glasses are suitable for cladding. In the aforedescribed three component glass, a variation of the index of refraction is hardly detected, even when the component ratio of $P_2O_5$ and $GeO_2$ is changed.

We have performed the following test for determining the waterproof characteristic of the aforedescribed three component glass. The test consists of crushing four kinds of glass samples A to D (Table 3) into a 35 to 60 mesh. The crushed glass is washed with distilled water and alcohol, and then dried. Thereafter, each sample of 10 g is heated respectively for three hours in 50 ml of distilled water and then cooled. The resistivity of the distilled water is then measured. For confirmation, a similar operation is performed with distilled water not containing glass powder, and calibration is provided as a blank test. The test results are shown in Table 3.

Table 3

| Sample | A | B | C | D |
|---|---|---|---|---|
| Component | | | | |
| $SiO_2$ | 75 | | | |
| $Na_2O$ | 15 | | | |
| $Li_2O$ | 5 | | | |
| CaO | 4 | | | |
| MgO | 1 | | | |
| $Al_2O_3$ | | | | |
| $GeO_2$ | | 80 | 50 | 47 |
| $P_2O_5$ | | 20 | 30 | 28 |
| $Ga_2O_3$ | | | 20 | 20 |
| $B_2O_3$ | | | | 5 |
| Resistivity ($\times 10^2$ ohm cm) | 9.9 | 0.9 | 15 | 6.5 |

As indicated by Table 3, sample C, which is glass consisting of three components, $GeO_2$, $P_2O_5$ and $Ga_2O_3$, shows the best waterproof characteristic. Sample C has a better waterproof characteristic than sample A, which includes an alkaline component. Sample D is inferior to sample C in the waterproof characteristic, but is drastically improved in the waterproof characteristic compared with sample B, which consists only of $GeO_2$ and $P_2O_5$.

As hereinbefore described, transparent glass may be obtained with only two components $P_2O_5$ and $GeO_2$. However, in order to provide sufficient water resistance to withstand ambient conditions in the manufacturing process or operation on glass used as an optical transmission line, $Ga_2O_3$ of at least 5 wt %, and desirably 10 wt %, or more, must be added. As hereinbefore described, $Ga_2O_3$ also becomes the dopant for controlling the refractive index of the glass at the same time. As hereinbefore explained, $Ga_2O_3$ is certainly a very effective component, but the water resistivity of the glass may also be improved by using one or more components of $Al_2O_3$, or $B_2O_3$, or CaO, instead of $Ga_2O_3$. It is, of course, possible to use the $Al_2O_3$, $B_2O_3$ and/or CaO together with $Ga_2O_3$.

In any case, satisfactory glass is not produced unless the sum of its components $P_2O_5$ and $GeO_2$ is greater than 50 weight % of the glass. Thus, for example, when $B_2O_3$ is added to three component glass in which the weight ratio of $P_2O_5$, $GeO_2$ and $Ga_2O_3$ is 3:5:2, transparent and homogeneous glass may be obtained when the ratio of $B_2O_3$ is less than 20%.

We have manufactured a clad type optical fiber using glass consisting of three components $P_2O_5$, $GeO_2$ and $Ga_2O_3$. We used the method of manufacture hereinafter explained.

A mixed gas of $POCl_3$ and $GeCl_4$ is controlled by adjusting the flow rate of gas, including each component, so that the ratio of $P_2O_5:GeO_2$ becomes 40:60. This mixed gas is introduced into the oxygen and hydrogen flame. Thereafter, flame hydrolysis is performed in the silica vessel, and oxide soot is thereby obtained. Then, $Ga_2O_3$ obtained individually by the flame hydrolysis method is added to the soot in such an amount that it becomes 10% by weight ratio. Core glass is thereby formed. On the other hand, $Ga_2O_3$ is added to the soot in such an amount that it becomes 17.5% by weight ratio. Cladding glass is thereby formed.

Figure 3:
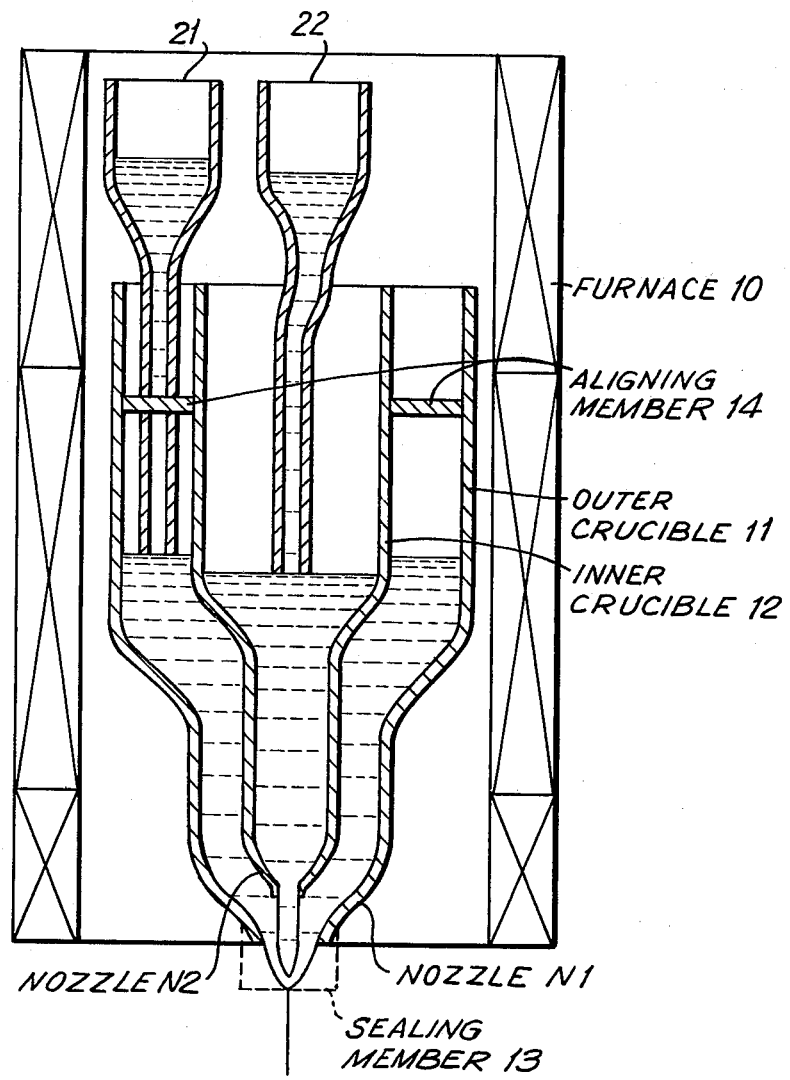
FIG. 3 is a sectional view of apparatus for the method of manufacture of the invention.

The two types of soot are placed in crucibles 11 and 12 of different sizes, as shown in FIG. 3. The two crucibles 11 and 12 are arranged coaxially in a heating furnace 10, forming a double crucible with the inner crucible 12 positioned within the outer crucible 11, as shown in FIG. 3. The configuration of the double crucible is as follows. The outer crucible 11 of the double crucible is filled with glass for cladding and the inner crucible 12 is filled with glass for the core. The bottoms of the crucibles 11 and 12 are provided with nozzles N1 and N2, respectively. The end of the nozzle N1 of the outer crucible 11 is closed by a thin silica sealing member 13 (FIG. 3).

Figure 4:
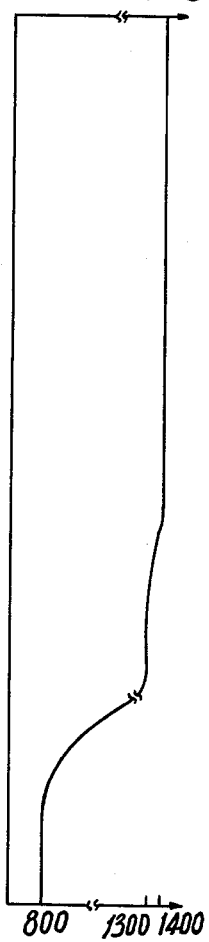
FIG. 4 is a graphical presentation of temperature variations in the melt in the apparatus of FIG. 3.

A rod-shaped aligning member 14 functions to align the two crucibles 11 and 12. The nozzles N1 and N2 are maintained at a temperature lower than the other parts, as shown in FIG. 4. The molten material in the crucibles 11 and 12 are kept at high viscosity so that they are not mixed and the upper parts of both crucibles are heated to 1300° C. to place both molten glasses in low viscosity condition. Under these conditions, dry oxygen is blown into the glass and bubbled before spinning, as shown in FIG. 5.

Figure 5:
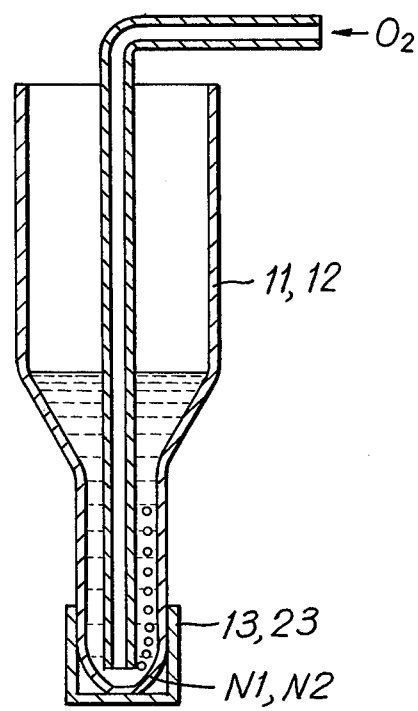
FIG. 5 is a sectional view of apparatus for the bubbling process of the molten glass by dry gas of the method of manufacture of the invention.

The furnace is omitted in FIG. 5 which shows the sealing members 13 and 23. The bubbling process utilizing dry gas, hereinbefore mentioned, is very effective for removing the water content of the glass. More particularly, the soot may contain a small amount of water, and if spinning is carried out without removing the water content, the water remains in the optical fiber. Specifically, the existence of an OH radical resulting from the water content is very harmful to the optical characteristics of the finished optical fiber. As a result of the removal of water from the glass, the optical characteristics, and especially the loss of transmission light of the optical fiber is considerably improved, as compared with glass produced without the bubbling process.

Figure 6:
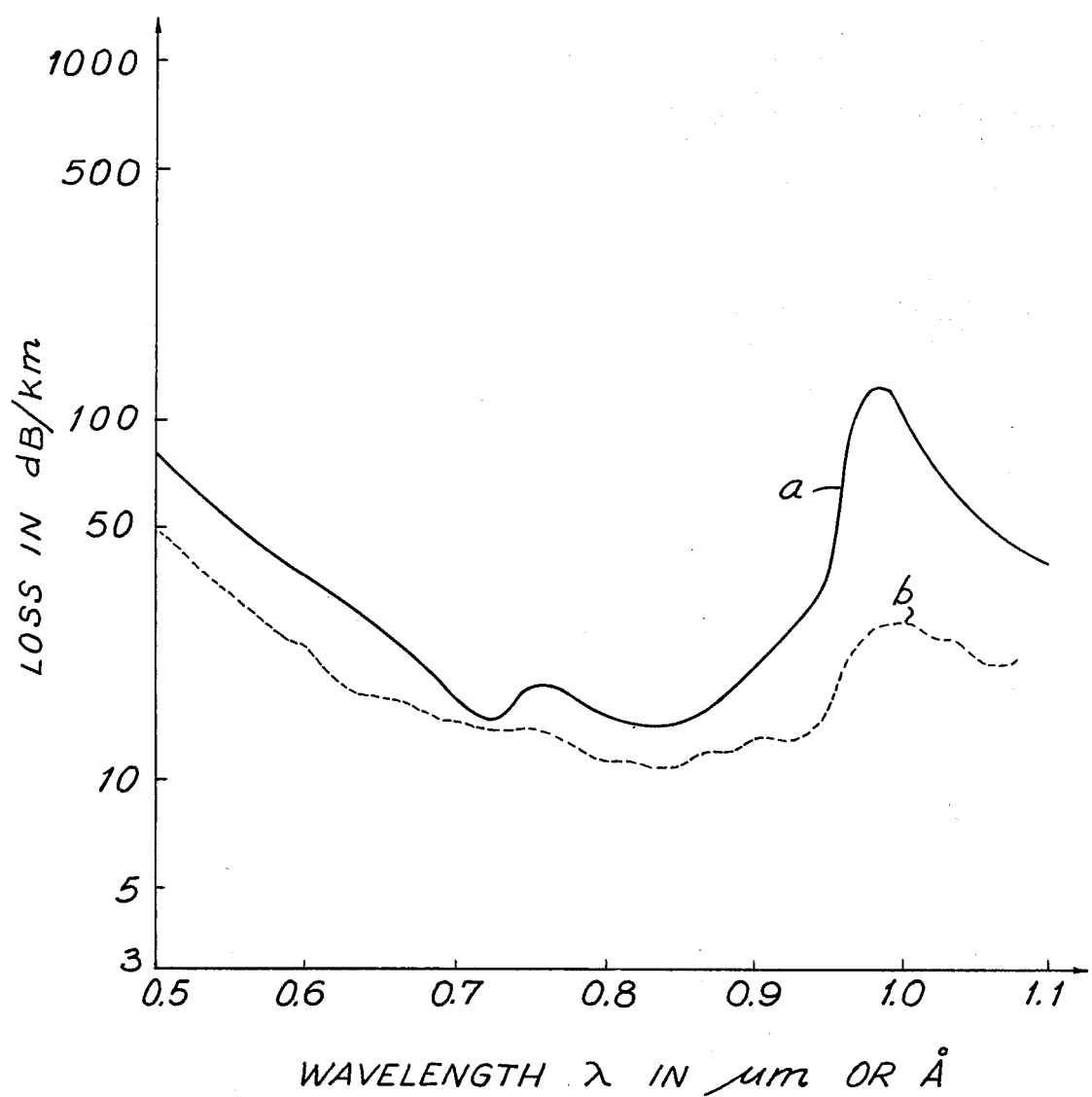
FIG. 6 is a graphical presentation illustrating the effect of the bubbling process.

FIG. 6 is a graphical presentation showing the effect of the bubbling process. In FIG. 6, the abscissa represents the wavelength of transmission light in micrometers or Å and the ordinate represents the loss in dB per kilometer. In FIG. 6, the curve "a" shows the characteristic obtained by bubbling for 15 minutes with oxygen gas flowing at a rate of 250 cc/min. The curve "b" of FIG. 6 shows the characteristic obtained by bubbling for 15 minutes with oxygen gas flowing at an increased rate of up to 2000 cc/min, or eight times the rate of flow in providing curve "a". The wavelength is λ.

The loss around the wavelength of 9800 Å is considerably decreased or improved in curve "b" as compared with curve "a". Almost the same effect may be obtained when argon or neon is used as the gas for bubbling, instead of oxygen.

When spinning is performed, using the apparatus of FIG. 3, the temperature is reduced up to 900° C. and the end of the nozzle N1 is opened by breaking the sealing material 13. The glass material is then drawn out at a speed of about 25 meters/min and finally formed into a clad type optical fiber having an outer diameter of 130 μm and a core diameter of 65 μm. The optical fiber thus produced provides such high performance as a transmission loss of 11 dB/km for optical transmission at a wavelength of about 0.83 μm or 8300 Å. The numerical aperture of this optical fiber is 0.2, the refractive index of the core glass is 1.612, and the refractive index of the cladding glass is 1.591. The thermal expansion coefficient of the core glass is $64.8 \times 10^{-7}/°C$. and that of the cladding glass is $64.9 \times 10^{-7}/°C$. Since the difference between these values is as small as the error in the measurement, there is no problem when there is a difference between the thermal expansion coefficients.

In accordance with the method of manufacture of the invention, a silica crucible is used as the reaction vessel. Since it is possible to lead the optical fiber directly out from this crucible, the method of manufacture is efficient and suitable for mass production. Furthermore, as shown in FIG. 3, the supply vessels 21 and 22 for supplying raw materials to the crucibles are provided at the upper parts of the crucibles 11 and 12, respectively, and spinning of optical fiber may be completed continuously, without interruption, by producing soot and providing vitrification within said supply vessels.

In the aforedescribed embodiments, a description of the composition, method of manufacture and nature of the finished optical fiber of only glass consisting of three components such as $P_2O_5$, $GeO_2$ and $Ga_2O_3$, is provided. However, this invention is not limited to these embodiments and may be modified in a desired form within the range of the subject of the invention. Thus, for example, a compound of $P_2O_5$ in the gaseous state may be provided with silicon dioxide $SiO_2$ as the oxide for preventing vaporization of the $P_2O_5$. The glass of the invention may contain one or more oxides selected from BeO, MgO, CaO, SrO, BaO, ZnO, CdO, $B_2O_3$, $Al_2O_3$, PbO and $As_2O_3$ as an additional eutectic oxide, in addition to the aforedescribed three components. In short, the principal feature of the invention is the improvement of phosphor glass, which had been thought to be impossible for practical use, due to the problems of waterproofing and loss due to vaporization of $P_2O_5$ in the manufacturing process. The phosphor glass of the invention may be used as an optical transmission line due to the addition of $Ga_2O_3$ and improvement in the method of manufacture.

The optical transmission line glass of the invention consists of a neutral or acidic oxide at least in its main component. The glass of the invention does not corrode a silica vessel, since the melting point is comparatively low. Therefore, it is possible to spin out a transmission line continuously by using a silica vessel, so that the glass of the invention is suitable as the material for the mass production of optical fiber having high quality. In addition, since the components of the glass of the invention may be made by utilizing a gaseous chemical reaction and vaporizing volatile $P_2O_5$ in only a small amount, such glass is highly suitable as the glass material for optical fiber due to its high purity. The content of undesirable and harmful impurities is extremely small.

Furthermore, $Ga_2O_3$ not only improves the waterproofing characteristic of the glass, but is also useful as the component for controlling the refractive index of the glass. The $Ga_2O_3$ functions to decrease the refractive index for the phosphor-germanium glass. $Ga_2O_3$ may thus be used for both purposes of controlling the refractive index and the water resistive quality of the cladding glass.

While the invention has been described by means of specific examples and in specific embodiments, we do not wish to be limited thereto, for obvious modifications will occur to those skilled in the art without departing from the spirit and scope of the invention.

We claim:

1. Optical transmission line glass having an improved waterproof property, consisting essentially of
   10 to 58 weight % of phosphoric pentoxide $P_2O_5$;
   15 to 85 weight % of germanium dioxide $GeO_2$; and
   5 to 40 weight % of gallium trioxide $Ga_2O_3$, said gallium trioxide being added to control the refractive index in values of less than 1.61 with said refractive index decreasing substantially linearly with increasing gallium trioxide.

2. Optical transmission line glass having an improved waterproof property as claimed in claim 1, wherein the gallium trioxide $Ga_2O_3$ is in an amount of at least 10 weight %.

3. Optical transmission line glass having an improved waterproof property, consisting essentially of
   75 to 90% of total weight of phosphoric pentoxide $P_2O_5$ and germanium dioxide $GeO_2$ mixed in a weight ratio of 4:6; and
   10 to 25 weight % of gallium trioxide, said gallium trioxide being added to control the refractive index with said refractive index decreasing substantially linearly with increasing gallium trioxide.

* * * * *